(12) United States Patent
Philips

(10) Patent No.: US 7,185,202 B2
(45) Date of Patent: Feb. 27, 2007

(54) METHOD AND APPARATUS FOR OBTAINING AN ELECTRONIC SIGNATURE FROM A BROWSER

(75) Inventor: Andrew B. Philips, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 852 days.

(21) Appl. No.: 10/388,345

(22) Filed: Mar. 12, 2003

(65) Prior Publication Data

US 2004/0187003 A1    Sep. 23, 2004

(51) Int. Cl.
*H04L 9/00*    (2006.01)
(52) U.S. Cl. ....................................................... 713/176
(58) Field of Classification Search ................... None
See application file for complete search history.

(56) References Cited

U.S. PATENT DOCUMENTS 6,408,388 B1 *  6/2002  Fischer ....................... 713/176

6,963,974 B1 *  11/2005  Skinner et al. ............. 713/176

OTHER PUBLICATIONS

Preston Gralla, How the Internet Works, Sep. 2001, Oue, pp. 9,13,14,21,153,154.*

* cited by examiner

*Primary Examiner*—Gilberto Barron
*Assistant Examiner*—Benjamin E. Lanier
(74) *Attorney, Agent, or Firm*—Park, Vaughan & Fleming, LLP; Edward J. Grundler

(57) ABSTRACT

One embodiment of the present invention provides a system for obtaining an electronic signature from a browser. During operation, the system receives a request for an electronic signature for a document, wherein the request is received from an application in a standardized format that is independent of browser type and signing method. Next, the system reformats the request to be compatible with a given browser type and signing method, and then forwards the reformatted request to the browser to obtain an electronic signature for the document. Finally, the system receives the electronic signature from the browser and returns the electronic signature to the application.

10 Claims, 4 Drawing Sheets

METHOD AND APPARATUS FOR OBTAINING AN ELECTRONIC SIGNATURE FROM A BROWSER

BACKGROUND

1. Field of the Invention

The present invention relates to the process of obtaining an electronic signature for a document. More specifically, the present invention relates to a method and an apparatus that enables an application to obtain an electronic signature for a document from a browser.

2. Related Art

As businesses increasingly make use of the Internet to conduct commercial transactions, it is becoming important to be able to electronically sign documents for purposes of transaction authorization and non-repudiation. Existing methods of electronically signing documents, while somewhat effective, present many difficulties when used in commercial transactions.

For example, FIG. 1 illustrates the process of electronically signing a document. The system in FIG. 1 includes a client 102, which hosts a browser 104, and a web server 106, which hosts an application 108. During operation of web server 106, application 108 requests an electronic signature for a document by sending a request 110 to browser 104. Browser 104 then signs the document and returns the signature 112 to application 108. In order to accomplish this signing process, application 108 needs to be aware of the display language, the browser type and version, and the signing mechanism supported by the electronic signature infrastructure associated with the browser instance.

Possible display languages include hypertext markup language (HTML), JAVA services page (JSP), and various graphical user interface languages (GUI), while possible browsers include Internet Explorer, Netscape Navigator, and Opera. (JAVA is a trademark of SUN Microsystems, Inc., Internet Explorer is a trademark of Microsoft, Inc., Netscape Navigator is a trademark of Netscape Communications Corporation, and Opera is a trademark of Opera Software ASA.)

Each browser instance can be associated with an electronic signature infrastructure that supports a proprietary method for signing documents. Note that electronic signature infrastructures can support a number of different signing mechanisms, for example based on: passwords, smart cards, handwriting acquisition, fingerprint analysis, and digital signatures (based on private key/pubic key pairs). Note that, there are many security platforms that support electronic signatures provided by companies such as Verisign, RSA, Entrust, Baltimore, and Identrus.

Thus, there are many combinations of display language, browser type and version, and signing protocol. Hence, if any of these combinations changes, application 108 must be reprogrammed to accommodate the change. This is a time-consuming process, which requires the application developer to be intimately familiar with specific display languages, browser types and signing mechanisms.

Hence, what is needed is a method and an apparatus for obtaining electronic signatures from browsers without the problems described above.

SUMMARY

One embodiment of the present invention provides a system for obtaining an electronic signature from a browser. During operation, the system receives a request for an electronic signature for a document, wherein the request is received from an application in a standardized format that is independent of browser type and signing method. Next, the system reformats the request to be compatible with a given browser type and signing method, and then forwards the reformatted request to the browser to obtain an electronic signature for the document. Finally, the system receives the electronic signature from the browser and returns the electronic signature to the application.

In a variation of this embodiment, the reformatted request includes the document and a return URL for the application.

In a further variation, the browser forwards the request to an external signature service to obtain the electronic signature.

In a further variation, the system sends the document and an application URL to the browser. The browser then sends the document and the application URL to the external signature service. The external signature service interacts with the browser to obtain the signature and then uses the application URL to return the signature to the application.

In a further variation, the system sends the document and an application URL to an external signature service. In response, the system receives a signature service URL from the external signature service. The system then forwards the reformatted request, including the signature service URL, to the browser to obtain the signature. The browser uses the signature service URL to send a request to the external signature service. The external signature service responds to the browser with the signature and the application URL. Next, the browser uses the application URL to return the signature to the application.

In a further variation, the system verifies that the signature is valid. This can involve validating the signature authority associated with the signature by determining if a certificate issued to the signature authority is valid.

In a further variation, the system saves the signature with the document in a manner that provides evidence for non-repudiation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Document Signing at the Browser

Figure 1:
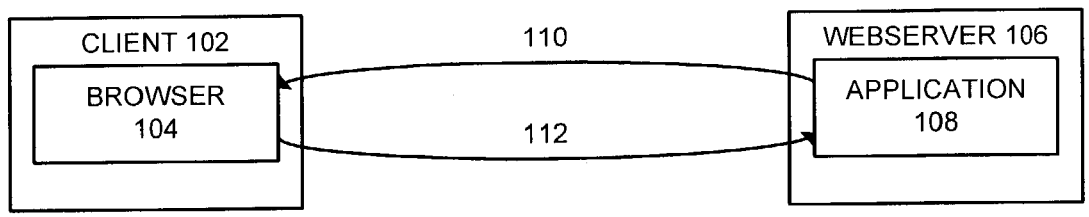
FIG. 1 illustrates the process of electronically signing a document.
Figure 2:
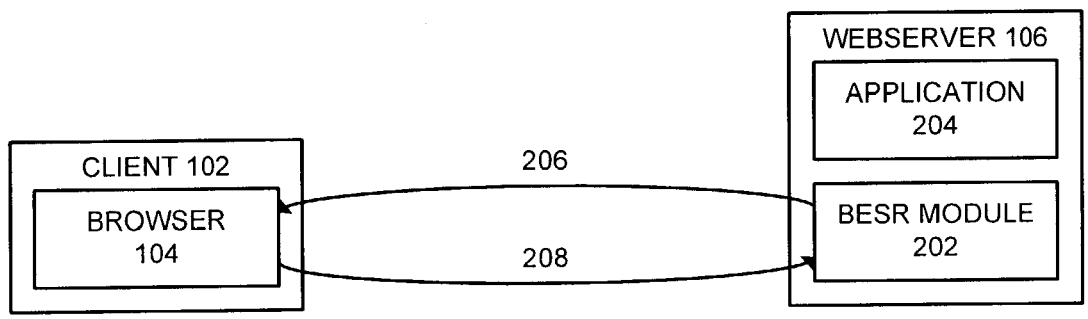
FIG. 2 illustrates the process of electronically signing a document in accordance with an embodiment of the present invention.

FIG. 2 illustrates the process of electronically signing a document in accordance with an embodiment of the present invention. In FIG. 2, browser electronic sign request (BESR) module 202 has been added to web server 106 from FIG. 1. BESR module 202 provides a standard interface that allows application 204 to request a signature for a document. Note that this standard interface allows application 204 to request signatures for documents without being aware of all of the methods and protocols for obtaining these signatures. Additionally, changes to these methods and protocols do not require changes to application 204.

BESR module 202 includes data describing the various methods of obtaining signatures. This data can be stored in one or more lookup tables, thereby allowing the methods to be changed without the necessity of changing the programming code for BESR module 202. During operation, BESR module 202 receives a document from application 204 with a request for signature. This request can include a browser type, or alternatively, the browser type can be a default browser type known to BESR module 202. In response to the request, BESR module 202 determines the proper methods and protocols to obtain the signature. In the example illustrated in FIG. 2, the signature is created within browser 104. BESR module 202 formats the request and sends request 206 to browser 104 in client 102. Browser 104 generates a signature for the document and returns the signature 208 to BESR module 202. Note that the signature can include the document. BESR module 202 then forwards the signature to application 204.

Browser Using an External Signature Service

Figure 3:
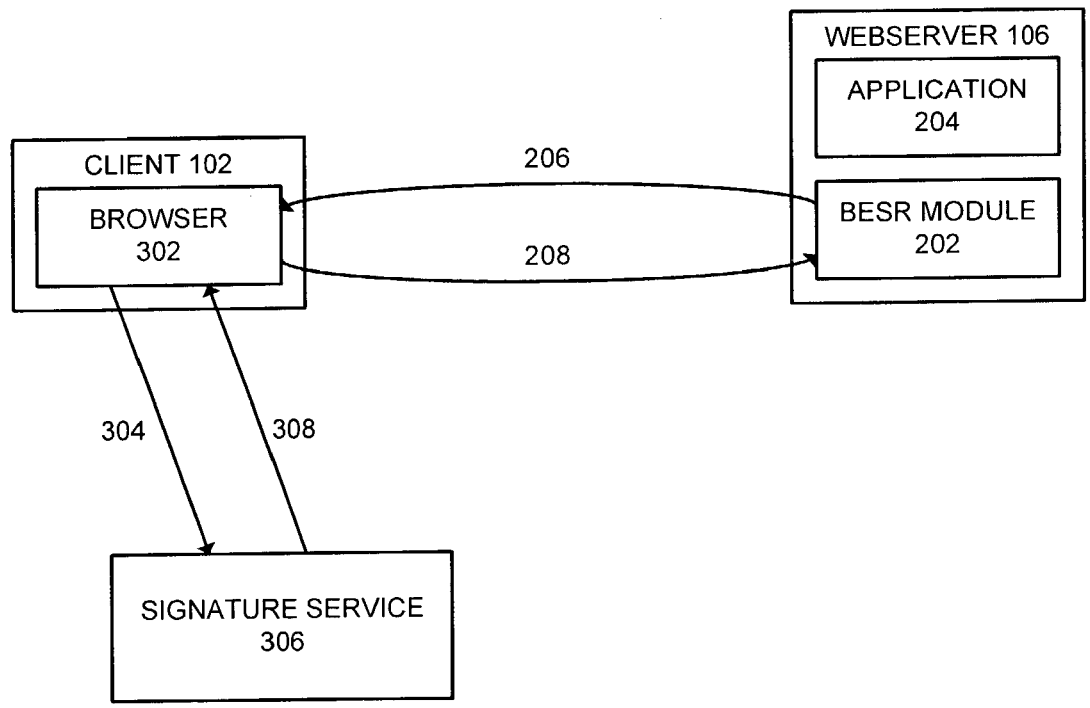
FIG. 3 illustrates using an external signature service to sign a document in accordance with an embodiment of the present invention.

FIG. 3 illustrates the process of using an external signature service 306 to sign a document in accordance with an embodiment of the present invention. In this embodiment, browser 302 receives signature request 206 from BESR module 202. This signature request includes the document and an application URL that specifies the return address for application 204. In response to this request, browser 302 sends a request 304, including the document to be signed and an application URL, to signature service 306. Signature service 306 then interacts with browser 302 (or a user of browser 302) to obtain a signature for the document and then uses the application URL to return the signature 308 to application 204.

Alternate Method of Using an External Signature Service

Figure 4:
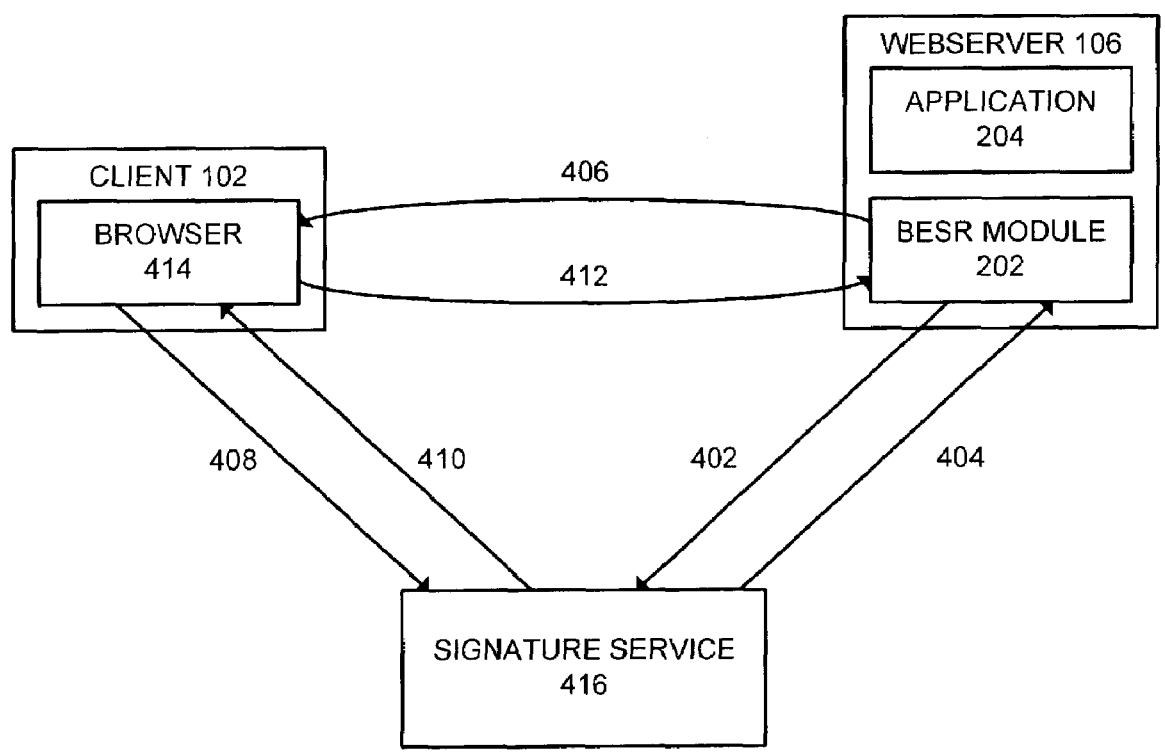
FIG. 4 illustrates using an external signature service to sign a document in accordance with another embodiment of the present invention.

FIG. 4 illustrates the process of using an external signature service to sign a document in accordance with another embodiment of the present invention. In this embodiment, BESR module 202 first forwards the document to be signed 402 and an application URL to external signature service 416. In response to the request, external signature service 416 returns signature service URL 404 to application 204. Application 204 then sends a signature request 406, including the signature service URL 404, to browser 414, so that browser 414 can locate external signature service 416. Browser 414 then interacts with external signature service 416 to obtain the signature from browser 414 (or a user of browser 414).

Next, external signature service 416 returns the signature 410 to browser 414. Browser 414 then uses the application URL to forward the signature in to application 204.

Signing at the Browser

Figure 5:
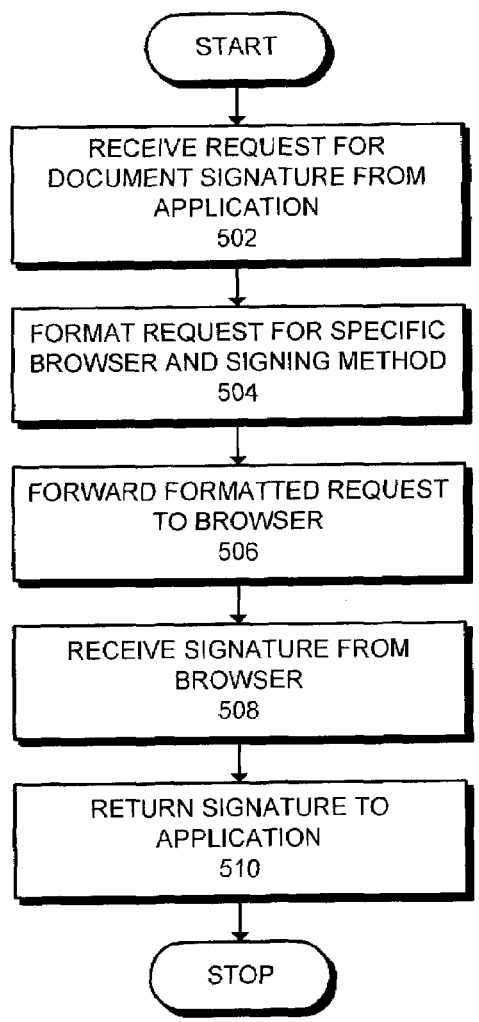
FIG. 5 presents a flowchart illustrating the process of signing a document at a browser in accordance with an embodiment of the present invention.

FIG. 5 presents a flowchart illustrating the process of signing a document at a browser in accordance with an embodiment of the present invention. Referring to FIG. 2, the system starts when the BESR module 202 receives a request for a document signature from an application 204 (step 502). The BESR module 202 then formats the request for the specific browser and signing method (step 504). Note that the system can determine the browser and signing method by performing a lookup into one or more tables associated with BESR module 202.

The system then forwards the formatted request to browser 104 (step 506). After browser 104 has signed the document, BESR module 202 receives the signature from browser 104 (step 508). Finally, BESR module 202 returns the signature to application 204 (step 510).

Signing at an External Signature Service

Figure 6:
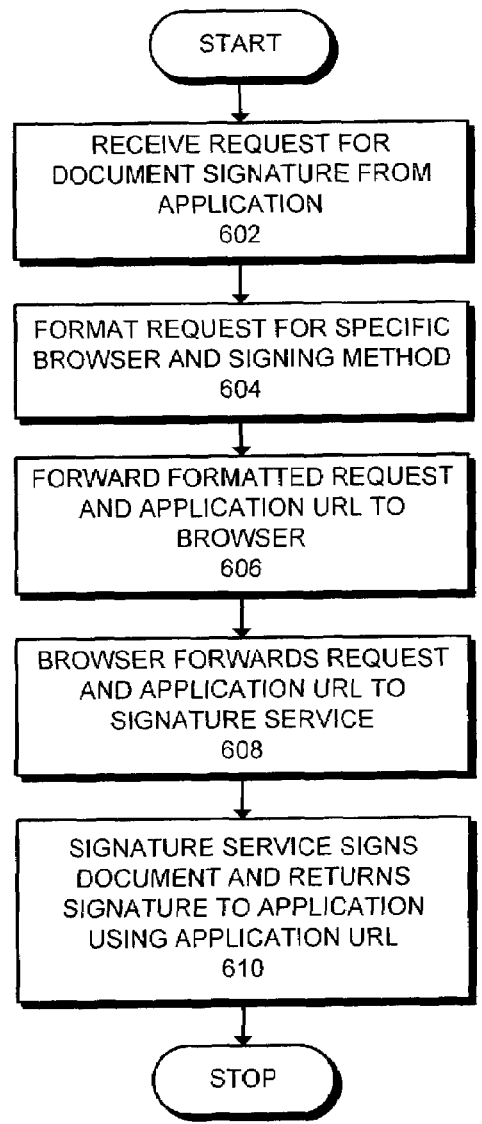
FIG. 6 presents a flowchart illustrating the process of signing a document at an external signature service in accordance with an embodiment of the present invention.

FIG. 6 presents a flowchart illustrating the process of signing a document at an external signature service in accordance with another embodiment of the present invention. Referring to FIG. 3, the system starts when the BESR module 202 receives a request for a document signature from application 204 (step 602). BESR module 202 then formats the request for the specific browser and signing method (step 604). Note that the system can determine the browser and signing method by performing a lookup into one or more tables associated with BESR module 202. BESR module 202 also includes an application URL in the formatted request.

The system then forwards the formatted request to browser 302 (step 606). Next, browser 302 forwards the request to external signature service 306 for a signature (step 608). External signature service 306 then interacts with browser 302 (or a user of browser 302) to obtain the signature. After obtaining the signature for the document, external signature service 306 uses the application URL to return the signature to browser 302 (step 610).

Alternate Method of Using an External Signature Service

Figure 7:
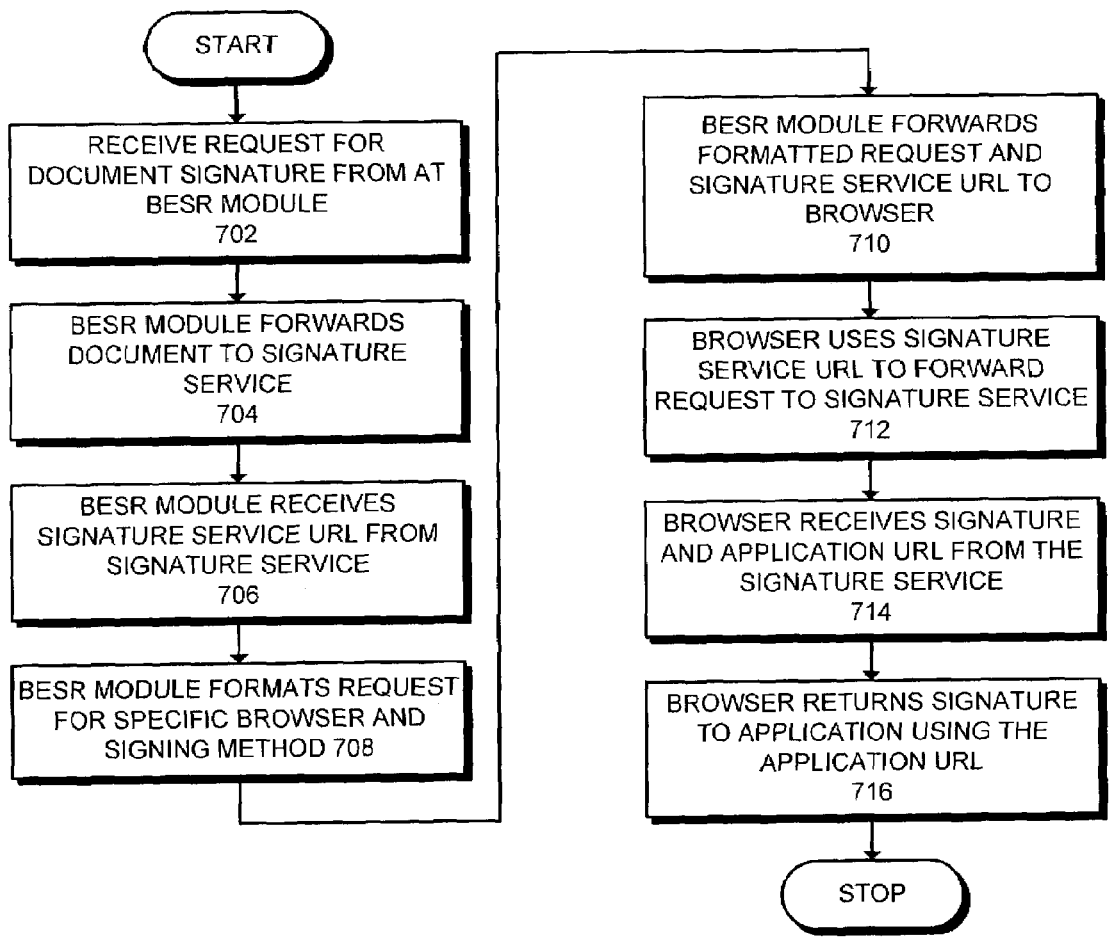
FIG. 7 presents a flowchart illustrating the process of signing a document at an external signature service in accordance with an embodiment of the present invention.

FIG. 7 presents a flowchart illustrating the process of signing a document at an external signature service in accordance with an embodiment of the present invention. Referring to FIG. 4, the system starts when BESR module 202 receives a request for a document signature from application 204 (step 702). Next, BESR module 202 forwards the document to external signature service 416 (step 704). In response, BESR module 202 receives a signature service URL from external signature service 416 (step 706).

BESR module then formats the request for the specific browser and signing method and includes the signature service URL in the request (step 708). The BESR module then forwards the formatted request, including the signature service URL, to browser 414 (step 710).

Browser 414 uses the signature service URL to locate and forward the request to external signature service 416 (step 712). External signature service 416 then interacts with browser 414 (or a user of browser 414) to obtain the signature. In response to the request, browser 414 receives the signature from external signature service 416 along with the application URL (step 714). Next, browser 414 uses the application URL to return the signature to application 204 (step 716).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for obtaining an electronic signature from a browser, comprising:
   receiving a request for an electronic signature for a document, wherein the request is received from an application in a standardized format that is independent of browser type and signing method;
   reformatting the request to be compatible with a given browser type and signing method;
   sending the document and an application URL to an external signature service;
   receiving a signature service URL from the external signature service;
   forwarding the reformatted request, including the signature service URL to the browser to obtain the signature;
   sending the request from the browser to the external signature service using the signature service URL;
   receiving the signature and the application URL from the external signature service at the browser; and
   using the application URL at the browser to return the signature to the application.

2. The method of claim 1, wherein the reformatted request includes the document and a return URL for the application.

3. The method of claim 1, wherein the browser forwards the request to an external signature service to obtain the electronic signature.

4. The method of claim 1, further comprising validating the signature by validating a signature authority associated with the signature, wherein validating the signature authority involves determining if a certificate issued to the signature authority is valid.

5. The method of claim 1, further comprising saving the signature with the document in a manner that provides evidence for non-repudiation.

6. A computer-readable storage medium storing instructions that when executed by a computer cause the computer to perform a method for obtaining an electronic signature from a browser, wherein the computer-readable storage medium includes magnetic and optical storage devices, disk drives, magnetic tape, CDs (compact discs), and DVDs (digital versatile discs or digital video discs), the method comprising:
   receiving a request for an electronic signature for a document, wherein the request is received from an application in a standardized format that is independent of browser type and signing method;
   reformatting the request to be compatible with a given browser type and signing method;
   sending the document and an application URL to an external signature service;
   receiving a signature service URL from the external signature service;
   forwarding the reformatted request, including the signature service URL to the browser to obtain the signature;
   sending the request from the browser to the external signature service using the signature service URL;
   receiving the signature and the application URL from the external signature service at the browser; and
   using the application URL at the browser to return the signature to the application.

7. The computer-readable storage medium of claim 6, wherein the reformatted request includes the document and a return URL for the application.

8. The computer-readable storage medium of claim 6, wherein the browser forwards the request to an external signature service to obtain the electronic signature.

9. The computer-readable storage medium of claim 6, the method further comprising validating the signature by validating a signature authority associated with the signature, wherein validating the signature authority involves determining if a certificate issued to the signature authority is valid.

10. The computer-readable storage medium of claim 6, the method further comprising saving the signature with the document in a manner that provides evidence for non-repudiation.

* * * * *